United States Patent [19]
Dory

[11] 3,861,200
[45] Jan. 21, 1975

[54] METHOD AND INSTRUMENT FOR ANALYSING MATERIALS BY ULTRASONIC PULSES

[75] Inventor: Jacques Dory, Coupvray, Esbly, France

[73] Assignee: Realization Ultrasoniques, Meaux, France

[22] Filed: Jan. 17, 1973

[21] Appl. No.: 324,288

[52] U.S. Cl. ............................................. 73/67.8 R
[51] Int. Cl. .......................................... G01n 29/04
[58] Field of Search ............... 73/67.5 R, 67.6, 67.7, 73/67.8 R, 67.8 S, 67.9

[56] References Cited
UNITED STATES PATENTS
| | | | |
|---|---|---|---|
| 3,299,694 | 1/1967 | Dickinson | 73/67.5 |
| 3,453,871 | 7/1969 | Krautkramer | 73/67.8 |
| 3,662,589 | 5/1972 | Adler et al. | 73/67.8 |

OTHER PUBLICATIONS
O. R. Gericke, Dual Frequency Ultrasonic Pulse-Echo Testing, J.A.S.A., Vol. 36, No. 2, Feb. 1964, pp. 313–322.
O. R. Gericke, Determination of the Geometry of Hidden Defects by Ultrasonic Pulse Analysis Testing, J.A.S.A., Vol. 35, No. 3, March 1963, pp. 364–368.

*Primary Examiner*—Richard C. Queisser
*Assistant Examiner*—John P. Beauchamp
*Attorney, Agent, or Firm*—William A. Drucker

[57] ABSTRACT

For non-destructive ultrasonic testing or measurement of the absorption coefficient of a material, a comparison is made of the amplitudes of the echoes received in two narrow frequency bands situated at either end of the spectrum of a transmitted pulse with a wide frequency spectrum.

A differential amplifier drives a centre-zero galvanometer and the direction in which its needle deviates gives an indication of the nature of the flaw or the value of the absorption coefficient.

4 Claims, 1 Drawing Figure

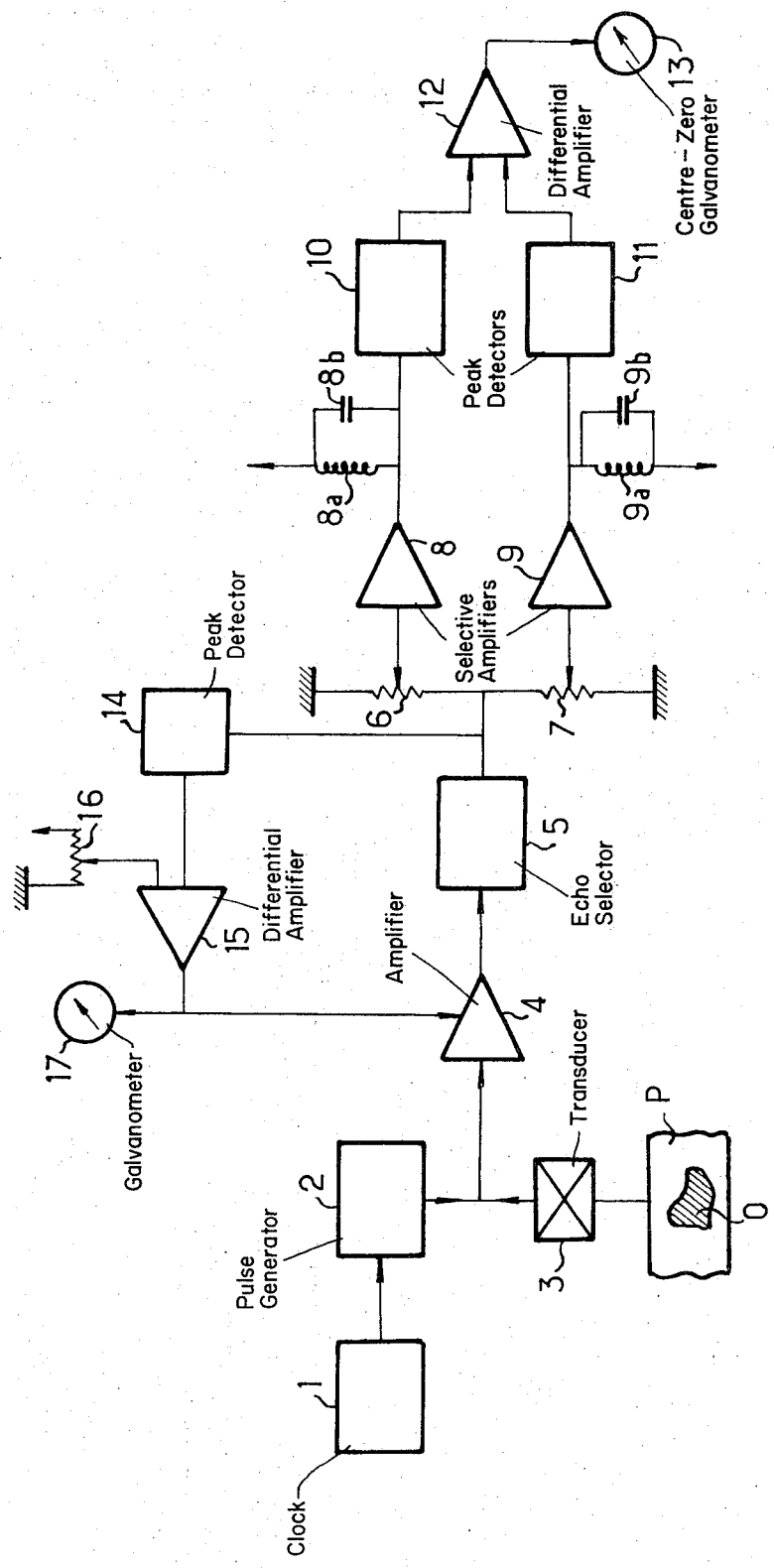

METHOD AND INSTRUMENT FOR ANALYSING MATERIALS BY ULTRASONIC PULSES

The invention relates to the analysis of the obstacles which disturb the propagation of acoustic waves through a given medium, and the measurement of the absorptive power of said medium.

The U.S. Pat. Spec. No. 3,756,071 filed on Mar. 1, 1971 by the same applicant, for "Process and apparatus for analyzing materials by means of ultrasonic pulses, employing the transfer function characteristic of each obstacle" describes a method of analysis basically consisting of directing towards the obstacle to be analysed, acoustic pulses or groups of acoustic pulses or groups of acoustic pulses comprising a plurality of components with different frequencies and analysing the relative amplitudes of the different frequency components of the echo received by the probe from this obstacle, preferably by reference to the relative amplitudes of the different frequency components of the echo coming from at least one reference obstacle, this reference obstacle advantageously being large and normally oriented to the ultrasonic beam.

In accordance with a particular method of operation, the probing pulses are shaped so that each one has a wide frequency spectrum which is predetermined and invariable from one pulse to another. An instrument for putting this method into practice comprises circuits for separating the frequency components of the flaw echo into several bands.

Calculating circuits are then provided, and duduce the relevant information regarding the obstacle from the relative amplitudes of the different signals so separated. The instrument is relatively complicated, notably due to the fact that the spectrum of the probing pulses is fairly irregular, so that correction circuits, complicated and difficult to set, have to be provided to facilitate analysis of the spectrum of the flaw echo.

The present invention proposes a simpler embodiment wherein the frequency spectrum of the signal received is divided into two bands only, the amplitudes of the corresponding signals being compound.

In accordance with the invention this; comparison is made by means of a differential amplifier followed by a centre-zero galvanometer. Experience shows that by setting the instrument so that an obstacle taken as a reference gives the zero, an indication, perfectly adequate for ordinary industrial applications, of the size and orientation of the obstacle is obtained simply by studying the direction of deviation of the galvanometer needle.

The invention also applies to measurement of the absorption coefficient, as will be seen later.

The various advantages of the invention will emerge clearly from the ensuing description.

The only FIGURE is the attached drawing is a basic diagram of an instrument in accordance with the preferred embodiment of the invention.

A clock signal generator 1 drives an oscillators circuit 2 capable of delivering pulses whose characteristics are suitable to excite an electro-acoustic transducer 3 so that the latter generates acoustic pulses with a wide frequency spectrum (e.g., from 1 to 10 MHz). The way in which this result can be obtained in practice will be explained later.

After reflection from an obstacle O inside a part P (or more generally, propagation through the medium to be analysed), the acoustic pulses return to the transducer 3 and give rise to echoes applied to a receiving amplifier 4. A selector circuit 5 constitutes an electronic window which separates the useful echoes (here, the first flaw echoes) from all parasitic signals. The selector circuit 5 may be of the type disclosed in the US patent specification above referred to and illustrated in FIG. 7 thereof.

These useful echoes are applied, via amplitudeing means 6 and 7, to two selective amplifiers 8 and 9 (the tuned circuits 8a 8b and 9a 9b symbolise the selective nature of the amplifiers 8 and 9). These respectively transmit two frequency bands centred around two values $F_1$ and $F_2$ situated at either end of the echo spectrum. For example, $F_1 = 1$ MHz and $F_2 = 8$ MHz, with pass bands ± 20 percent of the centre frequency.

After detection by two peak detectors 10 and 11, the output signals of the amplifiers 8 and 9 are applied to a differential amplifier 12, followed by a galvanometer 13.

Such as it has just been described, the instrument works in the following way:

The flaw echo has a frequency spectrum which depends on the size and orientation of the obstacle. Experience shows that, with a small obstacle, the highest frequencies of the spectrum are preferred in relation to the low frequencies. With a larger obstacle whose surface is inclined in relation to the ultrasonic beam, it is the low frequencies which are preferred. In practice it is very important, notably in the testing of machine parts, to be able to distinguish these two types of flaws from each other.

The instrument described enables this distinction to be made very simply, providing the relative amplitudes of the two signals transmitted by the selective amplifiers 8 and 9 are suitably set (which is symbolised by the parts 6 and 7). This setting is done by means of a reference obstacle (e.g., a large flat obstacle perpendicular to the beam) so as to make the two signals equal, i.e., obtain zero on the galvanometer. The latter's needle will then deviate to the left or the right, according to which of the two signals predominates.

It is desirable for the deviation of the needle to depend only on the ratio of the amplitudes of the two signals and not on the absolute value of these amplitudes. Now, it is obvious that the amplitude of the echo varies as a function of the characteristics of the obstacle and the propagation conditions. This is why the instrument advantageously includes means for bringing the output level of the selector circuit 5 back to a constant value.

The preferred embodiment described comprises, for this purpose, a peak detector 14 followed by a differential amplifier 15 which compares the amplitude of the output level at a reference voltage produced by a potentionmeter 16. 0

The output of the amplifier 15 drives an input controlling the gain of the receiving amplifier 4. The feedback loop so constituted brings the echo voltage back to a constant level. A galvanometer 17 measures the voltage controlling the gain of the amplifier 4. Obviously, the higher the input voltage of the amplifier 4, the higher this voltage, so that it measures the echo voltage before adjustment, thus supplying the information usually given by standard ultrasonic testing devices. This information constitutes an indication of the size and nature of the flaw, which completes that read from the galvanometer 13.

It has been stated above that the transducer 3 must be excited so as to generate acoustic pulses with a wide frequency spectrum. This result may advantageously be obtained by using a slightly damped transducer whose resonant frequency is $F_2$ and exciting it by means of electric pulses with a frequency $F_1$.

It goes without saying that the instrument described and shown may undergo modifications without departing from the spirit of the invention. In particular, the feedback loop which controls the echo level could be omitted.

A variant of the circuit arrangement illustrated in FIG. 1 consists of using amplifiers 8 and 9 with a logarithmic response curve; in this case, the output voltage of the differential amplifier 12 will only depend on the ratio between the echo levels for the two frequencies $F_1$ and $F_2$.

A useful application of the instrument described is the measurement of an absorption coefficient. The amplitude a of any echo signal transmitted or reflected by a medium with an absorption coefficient I is in the shape:

$$A = I/d \; A_0 e^{-\alpha f^2 d}$$

$d$ being the distance travelled by a signal with an initial amplitude $A_0$, $f$ being the frequency, $e$ being the base of neperian logarithms and $\alpha$ being a coefficient which depends on the propagation conditions.

The amplitude ratio of the echoes, for frequencies $F_1$ and $F_2$, is thus equal to: $A_1/A_2 = e^{-\alpha(F_1{}^2 - F_2{}^2)d}$ $F_1$ and $F_2$ being known and $d$ being fixed, $\alpha$ is thus easily deduced from the measurement of the amplitude ratio obtained by means of the variant just described.

Such a measurement is more precise based on the measurement of an amplitude ratio of two echoes than one based on measurement of the amplitude of only one echo, as it does not depend on the quality of the coupling between the transducer and the part.

I claim:

1. An apparatus for ultrasonic testing or measurement of the absorption coefficient of a material, said apparatus comprising generator means for generating recurrent electric pulses, transducer means, connected to said generator means, for converting said recurrent electric pulses into recurrent acoustic pulses with a frequency spectrum covering at least lower and higher substantially spaced frequency bands, said transducer means being coupled to said material, whereby said acoustic pulses are transmitted within the said material and corresponding acoustic response pulses are received by the said transducer means and converted into electric response pulses, amplifier means having an input connected to the transducer means and an output, first and second selective amplifier means connected to the output of said amplifier means, said first and second selective amplifier means including means to select the lower and higher frequency bands, respectively and having each an output, a differential amplifier having two inputs respectively connected to the respective outputs of the first and second selective amplifier means and an output, and a centre-zero galvanometer connected to the output of the differential amplifier, said selective amplifier means comprising voltage adjusting means.

2. An apparatus as claimed in claim 1, further comprising regulating means for fixing at a constant value the amplitude level of the signal received at the inputs of the selective amplifier means.

3. An apparatus as claimed in claim 2, wherein the said regulating means comprise differential amplifier means, connected to the output of the said amplifier means, for comparing the amplitude level at said output with a reference voltage, said differential amplifier means having an output, said amplifier means having a gain control input which is connected to the output of said differential amplifier means, and a meter connected to the output of the differential amplifier means.

4. An apparatus for ultrasonic testing of the absorption coefficient of a material, said apparatus comprising generator means for generating recurrent electric pulses, said generator means including an oscillator with an oscillating frequency comprised in a lower frequency band, transducer means, connected to said generator means, for converting said recurrent electric pulses into recurrent acoustic pulses, said transducer means having a resonant frequency comprised in a higher frequency band substantially spaced from the lower frequency band, said transducer means being coupled to said material, whereby said acoustic pulses are transmitted within the said material and corresponding acoustic response pulses are received by the said transducer means and converted into electric response pulses, amplifier means having an input connected to the transducer means and an output, first and second selective amplifier means connected to the output of said amplifier means, said first and second selective amplifier means including means to select the lower and higher frequency bands, respectively and having each an output, a differential amplifier having two inputs respectively connected to the respective outputs of the first and second selective amplifier means and an output, and a centre-zero galvanometer connected to the output of the differential amplifier, said selective amplifier means comprising voltage adjusting means.

* * * * *